United States Patent [19]

Parker

[11] Patent Number: 4,750,410
[45] Date of Patent: Jun. 14, 1988

[54] ROTATIONAL DEVICE FOR AIR CONDITIONER FLOW CONTROL

[75] Inventor: Jerome T. Parker, Michigan Center, Mich.

[73] Assignee: Sterling Engineered Products Inc., Maumee, Ohio

[21] Appl. No.: 115,163

[22] Filed: Oct. 30, 1987

Related U.S. Application Data

[63] Continuation-in-part of Ser. No. 885,941, Jul. 14, 1986, abandoned.

[51] Int. Cl.⁴ .............................................. B60H 1/34
[52] U.S. Cl. .......................................... 98/2; 98/40.28
[58] Field of Search ....................... 98/2, 40.24, 40.28, 98/114; 384/125, 152

[56] References Cited

U.S. PATENT DOCUMENTS

| | | | |
|---|---|---|---|
| 2,690,360 | 9/1954 | Young | 384/152 |
| 2,996,972 | 8/1961 | Johansson | 98/40.28 |
| 3,045,980 | 7/1962 | Johnson et al. | 98/40.24 X |
| 3,313,226 | 4/1967 | Johnson | 98/40.24 |
| 3,378,316 | 4/1968 | Hotine | 384/125 |
| 3,572,233 | 3/1971 | Bar et al. | 98/40.24 X |
| 3,648,592 | 3/1972 | Nieboer | 98/114 X |
| 3,952,639 | 4/1976 | Nobata | 98/2 X |
| 4,402,486 | 9/1983 | Jacquet | 98/2 X |

FOREIGN PATENT DOCUMENTS

| | | | |
|---|---|---|---|
| 91142 | 7/1981 | Japan | 98/2 |
| 1549177 | 7/1979 | United Kingdom | 98/40.24 |

*Primary Examiner*—Steven E. Warner
*Attorney, Agent, or Firm*—Marshall & Melhorn

[57] ABSTRACT

A control device adapted to be installed in a conduit for an automotive air conditioning system includes a generally rectangular housing mounted, for example, in the dash board of a vehicle to define an opening. A louver assembly is rotatably mounted in the housing on a pair of shafts which extend from end walls of the louver assembly into bearing apertures formed in the ends walls of the housing. An O-ring is installed on one of the shafts and frictionally engages the inner wall of one of the bearing apertures to enable the louver assembly to be selectively and rotationally positioned in the housing for controlling the amount and directional flow of the air out of the opening. A pair of slots formed in the end wall of the housing on either side of at least one of the bearing apertures define a resilient tab which allows the louver assembly to be snapped into and out of the housing.

19 Claims, 1 Drawing Sheet

U.S. Patent  Jun. 14, 1988  4,750,410
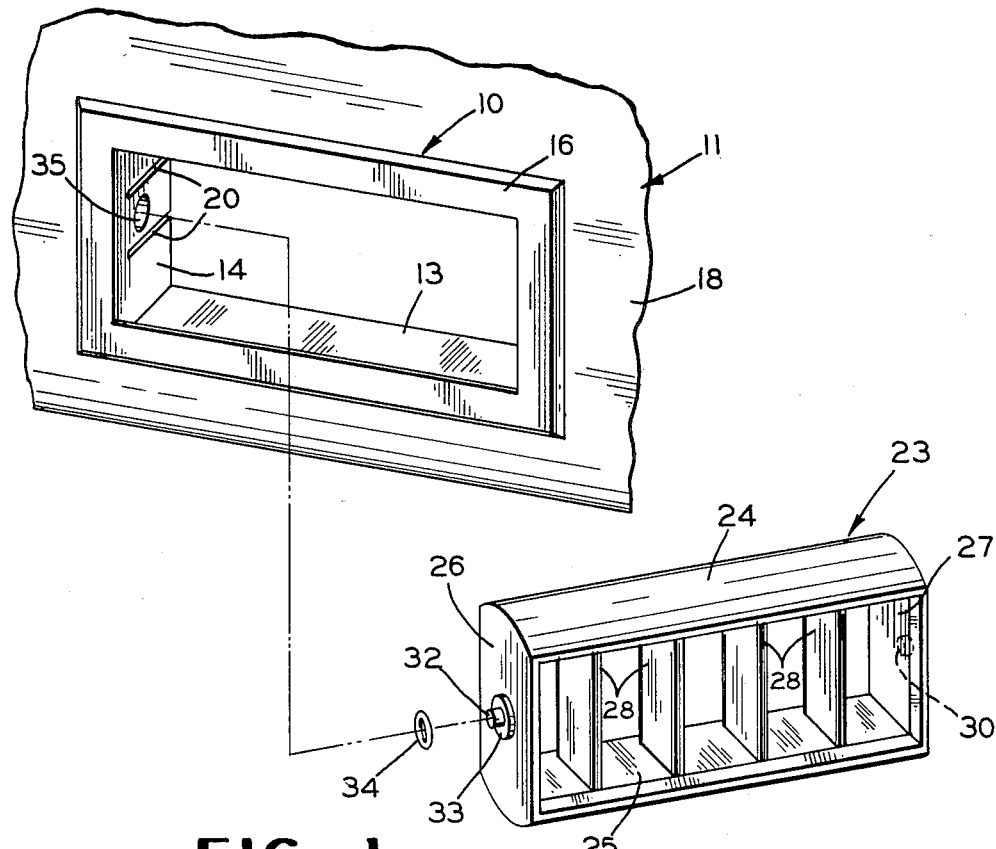
FIG. 1
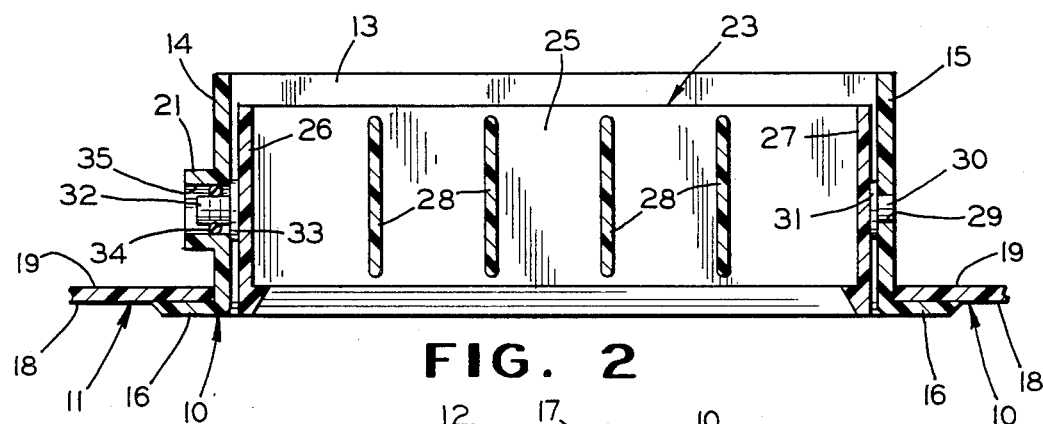
FIG. 2
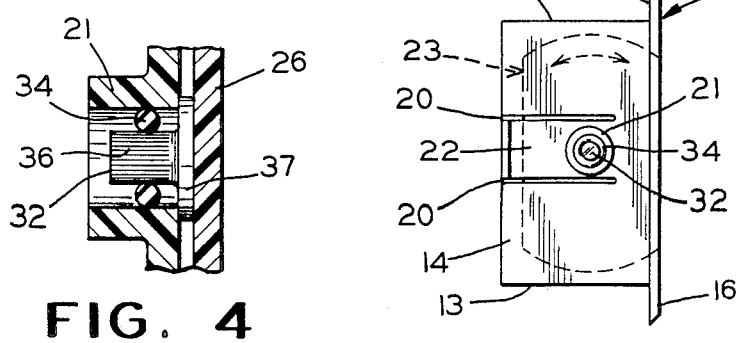
FIG. 4  FIG. 3

ROTATIONAL DEVICE FOR AIR CONDITIONER FLOW CONTROL

CROSS REFERENCE TO RELATED APPLICATION

This application is a continuation-in-part of my now pending application Ser. No. 885,941, filed July 14, 1986, now abandoned.

BACKGROUND OF THE INVENTION

This invention generally relates to a louver assembly for controlling the flow of fluid from a conduit and, more particularly, to a louver outlet assembly for controlling the volume and direction of air discharge from an air conditioning source.

Various types of louver assemblies are utilized for regulating the flow of air in a convection or forced air circulating system. In an automotive air conditioning system, the outlet assemblies generally include louvers which can be selectively rotated to regulate the volume and direction of fluid flow from a conduit. Currently, the outlet assemblies are typically formed from plastic material and the moveable elements are mounted on shafts which rotate in a bearing. Since the shaft and bearing are both made of plastic material, some form of detent system must be utilized to maintain the rotatable parts in a selected one of various positions. One form of detent system involves a fixed series of ribs or ratchet teeth engaged by a projection formed on the rotatable element. In another form, felt material backed with a pressure sensitive adhesive is applied to the shaft to provide a frictional engagement with the bearing surface.

The problem with detent systems is that they are noisy, difficult to operate smoothly, and are prone to breakage. The problem with the felt material is that it is sensitive to moisture and normal wearing such that it varies in size becoming too tight or too loose to operate properly.

SUMMARY OF THE INVENTION

The present invention concerns a rotational device which overcomes the problems of previous devices for use in a rotatable louver assembly for an automotive air conditioning system. A louver structure includes projecting shafts which are inserted into bearing apertures in the walls of a surrounding housing. An O-ring formed of rubber or a similar material is mounted on each shaft and is sized to provide a frictional fit with the bearing surface thereby providing smooth rotation operation and maintenance in any selected one of a plurality of rotation positions with respect to the housing. The bearing housings are formed with resilient tabs as part of the walls of the housing to enable the louver assembly to be snap-fitted into the housing.

The foregoing and other objects, advantages, and features of the present invention will become readily apparent to one skilled in the art from considering the following detailed description of a preferred embodiment of the invention when considered in the light of the accompanying drawings wherein like reference numbers denote like parts through the various views.

BRIEF DESCRIPTION OF THE DRAWINGS

FIG. 1 is an exploded perspective view of an automotive air conditioning louver assembly for and housing incorporating the present invention;

FIG. 2 is a top plan view taken as if in cross-section of the louver assembly and housing of FIG. 1 in assembled form;

FIG. 3 is an end elevational view of the louver assembly and housing of FIG. 1 in assembled form; and FIG. 4 is an enlarged cross-sectional view of the shaft, O-ring and bearing wall of a louver assembly in accordance with a preferred embodiment of the invention.

DESCRIPTION OF THE PREFERRED EMBODIMENT

The present invention is an improved device for rotatably mounting a louver assembly in a housing in an automotive air conditioning conduit system. Referring to the drawings, an air conditioning outlet housing 10 is mounted in an aperture formed in a surface such as the dashboard 11 of an automobile. The aperture is an opening in the wall of a conduit (not shown) for conditioned fluid from an air conditioning unit. The housing 10 defines a generally rectangular opening having upper and lower walls 12 and 13 respectively connected to end walls 14 and 15. A flange 16 is formed about the front edges of the walls 12, 13, 14 and 15 and extends outwardly from the opening formed by the walls in a plane generally perpendicular to the planes of the walls. Typically, an inner surface 17 of the flange 16 can be fastened to an outer surface 18 of the dash board 11 by any suitable means (not shown) such as fasteners or adhesives. In the alternative, fastening means (not shown) can be utilized to attach any one or more of the walls 12, 13, 14 and 15 to the dash board 11 on an inwardly facing surface 19 thereof.

The wall 14 has a pair of slots 20 formed therein extending from the rear edge of the wall 14 opposite the front edge to which the flange 16 is attached toward, but not in contact with, the flange 16. The slots 20 are formed parallel to one another and extend on opposite sides of an outwardly extending circular wall 21 defining the edge of an aperture formed in the wall 14. The portion of the wall 14 between the slots 20 is a tab 22 which includes the wall 21. The walls 12, 13, 14 and 15 are typically formed of a plastic material such that the tab 22 is somewhat resilient and can be forced out of the plane of the wall 14 by bending at a forward end of the tab 22 extending between the forward ends of the slots 20. A similar tab (not shown) can be formed in the wall 15.

A louver assembly 23 is rotatably mounted in the housing 10. The louver assembly 23 is similar to the housing 10 in that it is formed of an upper wall 24 and a generally parallel lower wall 25 connected to a pair of generally parallel end walls 26 and 27. The louver assembly includes a plurality of generally vertically extending fins 28 attached to and extending between an inwardly facing surface of the upper wall 24 and an inwardly facing surface of the lower wall 25. The fins 28 are approximately equally spaced and generally parallel to the end walls 26 and 27. The outwardly facing surfaces of the upper wall 24 and the lower wall 25 are convex from the front edge to the rear edge thereof in order to clear the inwardly facing surfaces of the upper wall 12 and the lower wall 13 of the housing 10 as the louver assembly 23 is rotated as will be discussed below.

As shown in FIG. 2, the wall 15 of the housing has an aperture 29 formed therein for receiving a mounting shaft or spindle 30 formed ono an outer surface of the end wall 27 of the louver assembly. The aperture and the shaft are generally circular in cross-section such that the side walls of the aperture 29 function as a bearing surface for the shaft 30. A circular step 31 is formed at the base of the shaft 30 and is of a larger diameter than the aperture 29 so as to space the end wall 27 of the louver assembly 23 from the end wall 15 of the housing 10.

A control shaft or spindle 32 is formed on the outer surface of the end wall 26 of the lower assembly and extends into the aperture defined by the circular wall 21. A circular step 33 is formed at the base of the shaft 32 and is of a larger diameter than the aperture formed by the wall 21 to space the end wall 26 of the louver assembly 23 from the end wall 14 of the housing 10. An O-ring 34 is installed on the shaft 32 and frictionally engages an inner surface 35 of the wall 21. The shaft 32, the O-ring 34 and the aperture defined by the wall 21 are dimensioned such that there is sufficient frictional engagement to allow the shaft 32 to rotate yet maintain the louver assembly 23 in any selected position of rotation with respect to the housing 10. The O-ring 34 is typically made from rubber, but can be composed of any suitable material which is dimensional stable in the environment of an automotive air conditioning system.

FIG. 4 illustrates a preferred embodiment of the invention wherein the shaft 32 is formed with serrations such as indicated at 36 in order to provide a lock for the O-ring 34 to the shaft. With this construction a fixed relationship is established between the O-ring and the shaft and the frictional relationship is between the O-ring and the inner surface 35 of the wall 21 to assure rotation of the shaft and O-ring together in the aperture defined by the circular wall. Of course, as will be readily appreciated by those skilled in the art, various means other than the serrations 36 can be provided to provide this relationship, e.g. the O-ring may be adhesively secured to the shaft, all of which means are within the purview of the invention.

Thus, the present invention concerns a control device for controlling the amount and direction of fluid released through the aperture in the dash board 11. The housing 10 includes a bearing aperture defined by the wall 21. A louver assembly 23 includes a shaft 32 extending generally coaxially with the bearing aperture. An O-ring 34 is mounted on the shaft 32 and frictionally engages a wall 35 of the bearing aperture to permit selective positioning of the louver assembly in the housing.

In accordance with the provisions of the patent statutes, the principles and mode of operation of the present invention have been illustrated and described in what is considered to represent its preferred embodiment. However, it should be noted that the present invention may be practiced otherwise than as specifically illustrated and described without departing from the spirit or scope of the attached claims.

What is claimed is:

1. In an automotive air conditioning system having a conduit for containing conditioned fluid and an aperture formed in a wall of the conduit for releasing the fluid from the conduit, a control device for controlling the amount and direction of the fluid released through the aperture, comprising:

a housing defining an opening and adapted to be installed in an aperture in a conduit wall, said housing having at least one wall with a bearing aperture formed therein;

a louver assembly rotatably mounted in said housing opening and including a control shaft extending generally coaxially within said bearing aperture; and an O-ring mounted on said control shaft and frictionally engaging a wall of said bearing aperture to resist rotation of said control shaft in said bearing aperture whereby said louver assembly can be selectively positioned by rotation of said control shaft and said O-ring together in said bearing aperture to control the amount and direction of fluid flow through said opening defined by said housing.

2. The control device according to claim 1, wherein said housing has a generally outwardly extending flange formed thereon about said opening for cooperating with a wall of a conduit.

3. The control device according to claim 1, wherein said one wall has a pair of generally parallel extending slots formed therein on either side of said bearing aperture.

4. The control device according to claim 1, wherein said housing includes a second wall extending generally parallel to said one wall and having a bearing aperture formed therein and wherein said louver assembly includes a mounting shaft extending generally coaxially within said bearing aperture in said second wall, each of said louver assembly shafts being attached to a respective wall of said louver assembly, each of said shafts having a step formed on the end attached to said respective wall, said steps being of larger diameter than an associated one of said bearing apertures and engaging said walls of said housing to space said walls of said louver assembly therefrom.

5. The control device according to claim 1, wherein said control shaft includes serrations in a surface thereof in contact with said O-ring.

6. The control device according to claim 1, wherein said housing includes a second wall extending generally parallel to said one wall and having a bearing aperture formed therein and wherein said louver assembly includes a mounting shaft extending generally coaxially within said bearing aperture in said second wall.

7. The control device according to claim 6, wherein said control and mounting shafts are each attached to a corresponding wall of said louver assembly, each said shaft having a step formed on the end attached to said corresponding wall, said steps being of larger diameter than said bearing apertures and engaging said one wall and said second wall of said housing to space said walls of said louver assembly therefrom.

8. A control device for an air conditioning system having a conduit for containing conditioned air and an aperture formed in a wall of the conduit for releasing the air from the conduit, the control device comprising:

a housing having a continuous wall defining an opening, said continuous wall having a pair of bearing apertures formed therein;

a louver assembly having a pair of shafts, each said shaft extending into and generally coaxially with a respective one of said bearing apertures for rotatably mounting said louver assembly in said housing opening; and at least one O-ring mounted on one of said shafts and frictionally engaging a wall of said respective one of said bearing apertures to resist rotation of said control shaft in said bearing apertures whereby said louver assembly can be retained in any selected one of a plurality of positions relative to said housing to control the flow of air through said opening by rotation of said one shaft and said O-ring together in said one bearing aperture.

9. The control device according to claim 8, wherein said continuous wall is formed of generally parallel upper and lower walls extending between a pair of generally parallel end walls.

10. The control device according to claim 9, wherein each of said bearing apertures is formed in a respective one of said end walls.

11. The control device according to claim 10, wherein one of said end walls has a pair of generally parallel slots formed therein, one of said slots located on either side of said bearing aperture formed in said one end wall.

12. The control device according to claim 9, wherein said continuous wall is formed as a generally rectangular frame adapted to be inserted into and retained in an aperture formed in an air conditioning system conduit, and said louver assembly is generally rectangular in form having generally parallel upper and lower walls extending between a pair of generally parallel end walls.

13. The control device according to claim 12, wherein said upper and lower walls of said lower assembly have convex outer surfaces and wherein a plurality of generally parallel fins extend between inner surfaces of said upper and lower walls of said louver assembly.

14. A control device for an automotive air conditioning system having a conduit for containing conditioned air and an aperture formed in a wall of the conduit for releasing the air from the conduit, the control device comprising:

a housing formed of generally parallel upper and lower walls extending between a pair of end walls to define a central opening;

a louver assembly having a frame formed of generally parallel upper and lower walls extending between a pair of generally parallel end walls;

said end walls of said housing each having an aperture formed therein, and said end walls of said louver assembly each having a shaft formed thereon, said shafts extending into and generally coaxially with respective ones of said apertures; and an O-ring mounted on one of said shafts and frictionally engaging a wall of an associated one of said apertures for maintaining said louver assembly in any selected one of a plurality of positions with respect to said housing by rotation of said one shaft and said O-ring together in said one bearing aperture whereby said control opening is partially blocked by said louver assembly.

15. The control device according to claim 14, wherein said housing includes a generally circular wall extending from an exterior surface about the bearing aperture in the one of said end walls associated with said one of said shafts on which said O-ring is mounted, said circular wall having an inwardly facing surface defining a bearing surface for frictionally engaging said O-ring.

16. The control device according to claim 14, wherein each of said shafts has a step formed at an end attached to said end wall, each said step engaging an adjacent one of said end walls of said housing to space said end walls of said louver assembly from said end walls of said housing.

17. The control device according to claim 14, wherein said one shaft includes serrations in a surface thereof in contact with said O-ring.

18. The control device according to claim 14, wherein said O-ring is formed of rubber.

19. The control device according to claim 14, wherein said housing has a flange formed on an outer edge of said upper, lower and end walls extending away from said central opening.

* * * * *